United States Patent [19]

Knight

[11] 3,920,211

[45] Nov. 18, 1975

[54] LUNCH BOX HOLDER
[75] Inventor: Martin Knight, Leesville, Ohio
[73] Assignee: The Raymond Lee Organization, Inc., New York, N.Y. ; a part interest
[22] Filed: Mar. 7, 1974
[21] Appl. No.: 448,804

[52] U.S. Cl. .............................. 248/311; 224/45 B
[51] Int. Cl... F16m 13/02; A47b 73/00; A47c 7/70
[58] Field of Search ........... 248/311, 309, 310, 215; 211/88, 75, 90; 224/42.45 B, 42.43, 42.44

[56] References Cited
UNITED STATES PATENTS

| 2,474,943 | 7/1949 | Hedger | 248/311 UX |
| 2,499,103 | 2/1950 | Love | 248/310 X |
| 2,673,057 | 3/1954 | Morris | 248/311 |
| 2,784,889 | 3/1957 | Kennedy | 224/42.45 B |

FOREIGN PATENTS OR APPLICATIONS

| 376,490 | 5/1923 | Germany | 248/311 |

Primary Examiner—J. Franklin Fess
Attorney, Agent, or Firm—Howard I. Podell

[57] ABSTRACT

A holder for a lunch box adaptable for fitting over the back rest of an automobile seat that provides a resting place and support for a lunch box, and prevents the lunch box from shifting position while the automobile is in motion.

3 Claims, 2 Drawing Figures

LUNCH BOX HOLDER

SUMMARY OF THE INVENTION:

My invention relates to a holder for a lunch box in the form of a pair of brackets which hook over the back rest of an automobile seat that provides a support and resting place for a lunch box.

An advantage of this invention is that a fastened lunch box is restrained from shifting while the automobile is under way preventing breakage or spillage of the contents of the lunch box.

BRIEF DESCRIPTION OF THE DRAWING:

The objects and features of the invention may be understood with reference to the following detailed description of an illustrative embodiment of the invention, taken together with the accompanying drawings in which.

Figure 1:
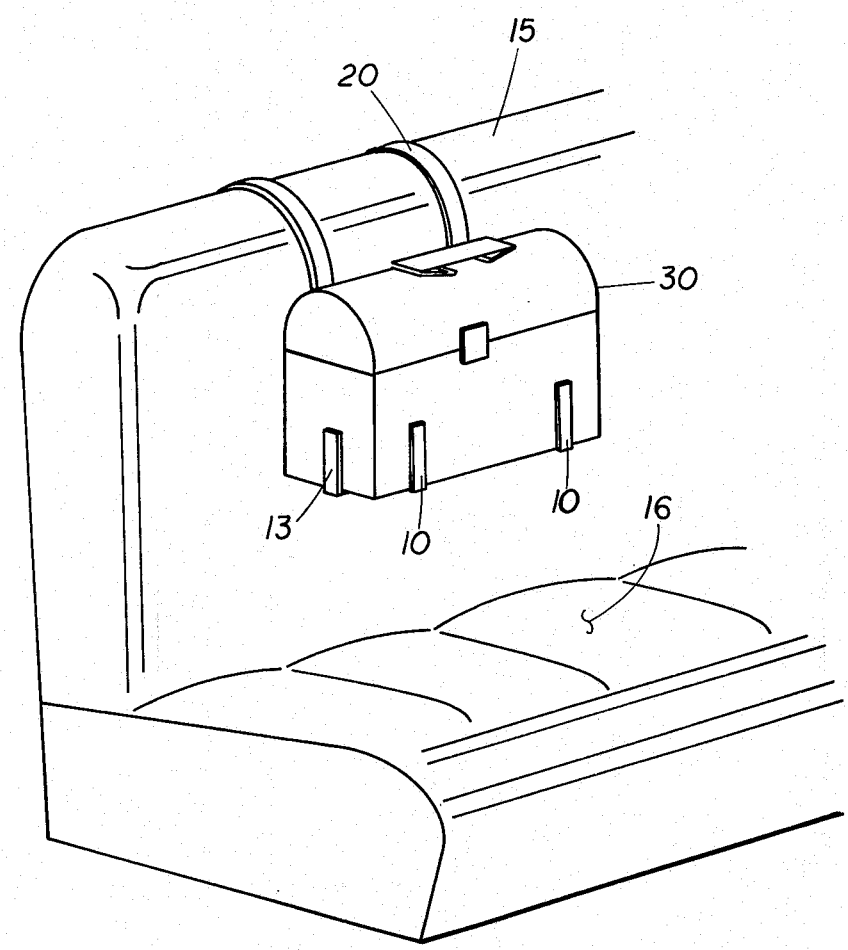
FIG. 1 is a perspective view of the invention in use.
Figure 2:
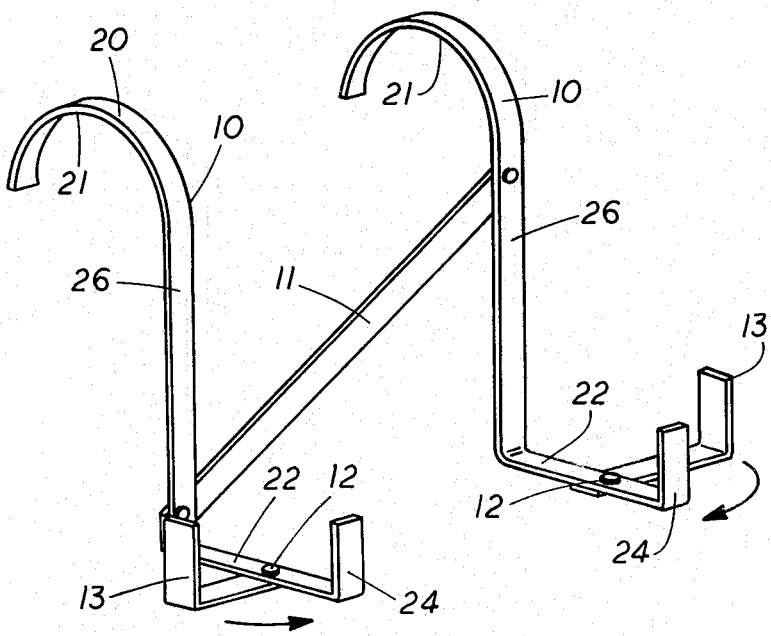
FIG. 2 is a perspective view of the invention.

DESCRIPTION OF THE PREFERRED EMBODIMENT:

Turning now descriptively to the drawings, in which similar reference characters denote similar elements throughout the several views, FIGS. 1-2 illustrate the device 20 which consists of two brackets 10 in the form of inverted U-shaped members 21 at their upper ends and terminating each in an L-shaped extension 22 at their lower ends, with the L-shaped extensions 22 projecting away from the U-shaped members. A brace member 11 is riveted to each bracket 10 to join the brackets 10 together.

The lower extremity of each L-shaped extension 22 of brackets 10 is bent up to form a stop 24 so that a lunch box 30 of conventional size may rest on horizontal section 22 of brackets 10 between the vertical stops 24 and the vertical mid sections 26 of the brackets 10. An End stop 13 is riveted to each extension 22 to restrain transverse motion of the lunch box 30 resting on the device 20.

In use, the device 20 is hung from the U-shaped ends 21 of brackets 10 over the top of a backrest 15 of an automobile seat, with the L-shaped extensions 22 projecting in a horizontal plane over and above the seat 16, as shown in FIG. 1. The lunch box 30 is restrained from motion in any horizontal direction and may be readily lifted out of, or inserted into the device 20.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A bracket device adaptable for hanging from the top of a backrest of an automobile seat which retains a box in place so as to prevent horizontal motion of the retained box, said bracket device consisting of two inverted U-shaped members, each of a size to hang over the top of an automobile seat back, with the said two members joined together at a spaced distance from each other by a bar fastened with one rivet to each member, the lower sections of the device, when installed on an automobile seat back, shaped to project in a horizontal plane away from the seat back, said lower sections each fitted with an end stop and side stop disposed so as to fit respectively about a side and an end of a box resting on said lower sections, each said side stop being fomed of a bent flange at the end of a lower section of one of the inverted U-shaped members, and each said end stop formed of a bent clip fastened by one rivet to the lower section of an inverted U-shaped member.

2. The combination as recited in claim 1 together with a conventional lunch box resting on the lower sections of the device.

3. The combination as recited in claim 2 installed on the backrest of an automobile seat.

* * * * *